INVENTORS
DAVID E. BLAIR
H. KARL FRENSDORFF
RALPH E. FULLER

United States Patent Office 3,535,917
Patented Oct. 27, 1970

3,535,917
CONTINUOUS DILUTION VISCOMETER
David E. Blair and Hans Karl Frensdorff, Wilmington, and Ralph E. Fuller, Claymont, Del., assignors to E. I. du Pont de Nemours and Company, Wilmington, Del., a corporation of Delaware
Filed Oct. 27, 1967, Ser. No. 682,718
Int. Cl. G01n 11/08
U.S. Cl. 73—55                 7 Claims

ABSTRACT OF THE DISCLOSURE

Apparatus and process for measuring limiting viscosity number by forcing a solution of the solute under pressure through a constricted conduit at a measured rate while gradually diluting the solution with solvent and noting any changes in pressure and rate of throughput as dilution proceeds.

BACKGROUND OF THE INVENTION

Measurements of solution viscosity of a solute are customarily carried out by a batch procedure. In prior art methods, several solutions, having different concentrations of a solute, are prepared and the viscosity of each is determined by measuring the time for each to pass through a constricted orifice or capillary at constant temperature. The viscosity values are calculated from the measured times and concentrations and can then be plotted against concentrations to provide a viscosity curve for the solution at the temperature utilized. The "limiting viscosity number" for the solute in the particular solvent employed is obtained by extrapolating this curve to zero concentration. Because a number of separate determinations must be made, each involving several operations, this batch procedure is necessarily tedious and time consuming. There has been a need for a means for determining limiting viscosity number on a continuous dilution basis whereby a single determination provides viscosity values over the whole range of dilutions desired. The ability to easily determine viscosities over a broad range of shear rates and at a constant shear rate has likewise been needed.

THE INVENTION

In accordance with this invention there is provided a process and apparatus for accurately determining the limiting viscosity number of a material in a simple, efficient and economical manner. The process involves measuring the viscosity of a solution of the material (solute) by forcing the solution under pressure through a constricted conduit, such as a capillary tube, at a measured rate of throughput, while gradually reducing the solute concentration of the solute in the solution which enters the conduit and observing any changes in pressure and in the rate of throughput during dilution of the solution. The apparatus and solution are preferably maintained at constant temperature to obtain consistent and reproducible measurements. This is accomplished by immersing the apparatus in an oil or water bath.

Figure 1:
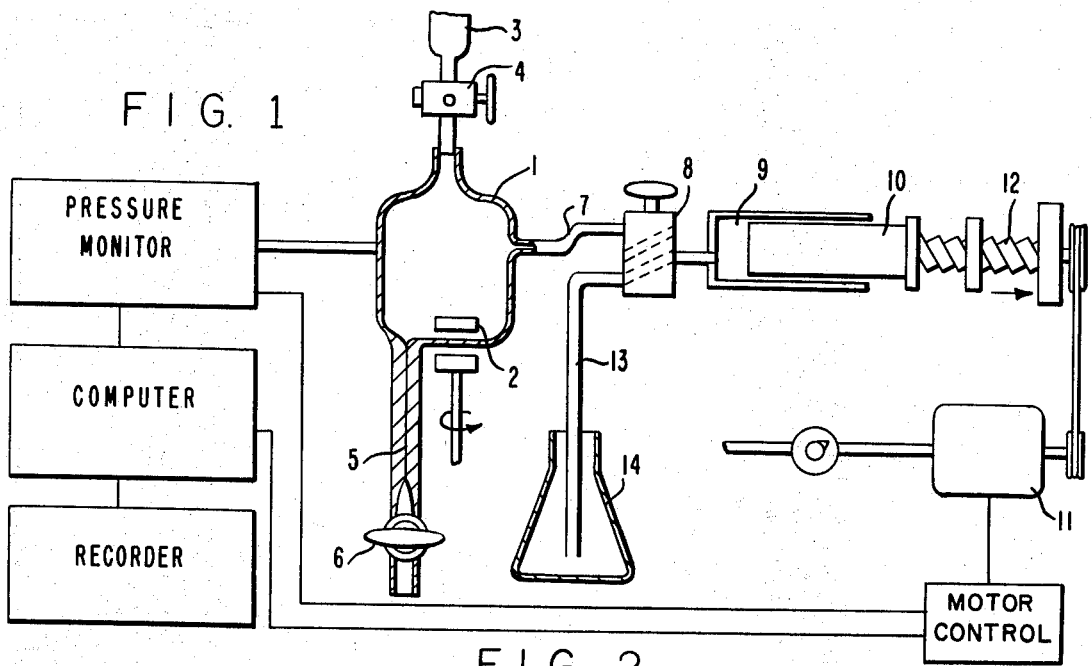
Figure 2:
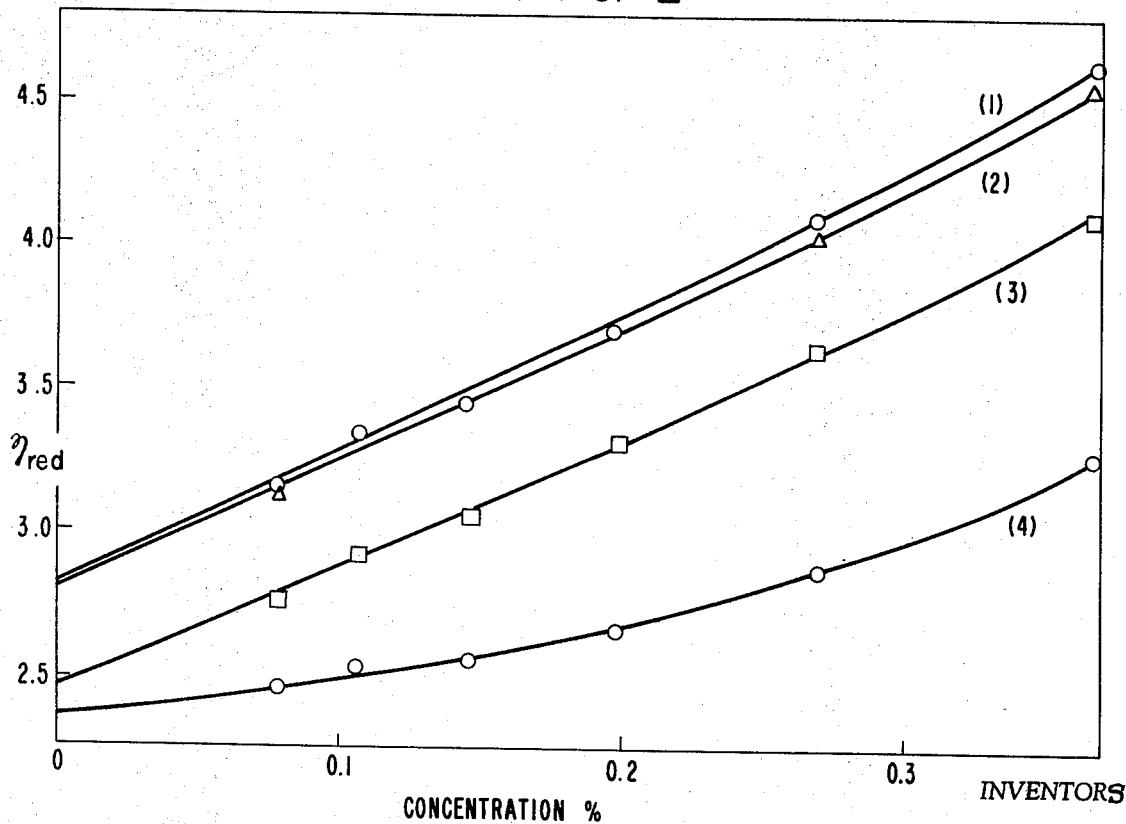

The invention can be more easily understood by reference to the drawings. FIG. 1 is a schematic drawing of an embodiment of the apparatus of this invention and FIG. 2 is a graph showing viscosities determined at several different shear rates.

In FIG. 1, cell 1 is a vessel having a known and fixed volume, fitted with stirrer 2, sample inlet tube 3 separated from the cell by stopcock 4, and outlet capillary 5 leading to stopcock 6. Cell 1 also communicates through inlet tube 7 and stopcock 8 with syringe 9 fitted with plunger 10, the latter being actuated by constant speed motor 11 through a belt and pulley or similar drive system connected to screw means 12. Other equivalent means for actuating plunger 10 at a constant or known variable rate can also be used. Stopcock 8 is a two-way stopcock which connects tube 7 with syringe 9 or syringe 9 with tube 13 and solvent reservoir 14 as desired. Cell 1 also communicates with a pressure monitor which in turn can be connected electrically to a recorder, computer or the like to facilitate computations or even for direct readout.

In operation, cell 1, after thorough cleaning, is filled with a sample solution of the solute, the limiting viscosity number of which is to be measured. The solute can be a solid or liquid. The sample is added through inlet 3 until the cell is filled up to stopcock 4. Syringe 9 is filled with solvent to be used in diluting the sample solution by opening stopcock 8 to suck solvent from reservoir 14 by operation of plunger 10. Stopcock 4 is closed, stopcock 6 is opened, and stopcock 8 is adjusted to connect cell 1 with syringe 9. The stirrer and constant speed motor are then started and as the plunger of the syringe moves inwardly the solution in the closed cell is forced through capillary 5 through open stopcock 6. In this preferred embodiment the constant speed motor provides a constant movement of the syringe plunger and thereby forces the solution through the capillary at a constant volume rate. A uniform and continuous dilution of the solution in the cell occurs due to vigorous agitation by stirrer 2 as the continuously added solvent enters the cell. Naturally the syringe should be of sufficient volume to provide dilution of the sample to the extent desired.

As dilution of the solution proceeds the pressure necessary to force the sample solution through the capillary diminishes with time and this is noted on the pressure monitor. Because the dilution is gradual and continuous, it is desirable, though not essential, that the pressure monitor be connected to a recorder so that a continuous record of pressure/concentration is available. The data thus obtained permits a determination of the limiting viscosity number of the solute at the particular shear rate utilized.

To determine the limiting viscosity number of the sample it is also necessary to operate the apparatus with solvent alone. Naturally the solvent should be the same as that used to dilute the sample solution. To do this the cell and syringe are filled with the solvent and the pressure necessary to force the solvent through the capillary at the same volume rate as with the sample solution is noted. This value ($P_o$) is then utilized in the calculations below.

Limiting viscosity number of a solute in dilute solution is determined using the following notations:

$C_o$ = initial concentration of solute in solution in cell
$C$ = concentration of solute in solution in cell at time $t$
$V_o$ = volume of cell V = total volume of solvent delivered up to time $t$ during run
X = $C_oV_o$ = weight of solute contained in cell initially
$CV_o$ = weight of solute in cell at time $t$ $$R = \frac{dV}{dt} \text{ where } t \text{ is time}$$

The rate at which X is decreasing is $$\frac{dX}{dt} = V_o \frac{dC}{dt} = -CR$$

$$\frac{dC}{dt} = -\frac{CR}{V_o} = -\frac{dV}{dt}\frac{C}{V_o}$$

$$\frac{dC}{C} = -\frac{dV}{V_o}$$

$$\ln C = -\frac{V}{V_o} + K$$

at $C = C_o$, $V = 0$; $K = \ln C_o$ $$\ln C = -\frac{V}{V_o} + \ln C_o$$

and $\ln \frac{C}{C_o} = -\frac{V}{V_o}$ $$C = C_o e^{-V/V_o}$$

The relationship of pressure to viscosity ($\eta_{red}$) in this system is as follows:

$$\eta_{red} = \frac{\frac{P_s}{P_o} - 1}{C}$$

where:
$P_s$ = pressure developed by the flow of test solution through the capillary at time $t$
$P_o$ = pressure developed by the flow of pure solvent through the capillary
$C = C_o e^{-V/V_o}$ To calculate the limiting viscosity number, a plot of $\eta_{red}$ vs. concentration is extrapolated to infinite dilution; the $\eta_{red}$ intercept is the limiting viscosity number.

FIG. 2 shows a plot of a series of viscosity determinations at 30° C. and various rates of shear obtained by varying motor speeds. Curves (1), (2), (3) and (4) represent shear rates of 590, 1180, 1770 and 3540 reciprocal seconds and correlate very closely with curves obtained by measurements by classical methods at the same shear rates. The material investigated was a 0.5% by weight solution of ethylene/propylene/1,4-hexadiene rubber dissolved in tetrachloroethylene. It is noteworthy that the limiting viscosity number varies with the rate of shear, being higher as shear rate decreases.

Using prior art batch procedures for determining limiting viscosity numbers, each value entered on a curve of FIG. 2 is determined by a separate experiment whereas the present process and apparatus permits these values to be determined in a single run starting with a single solution of known concentration. The zero concentration values are obtained by extrapolation of the curve representing measured values.

It will be apparent that the apparatus can also be utilized to force the successively diluted liquid through the capillary at constant elevated pressure rather than at a constant volume rate.

In operation, the pressure monitor is set for a desired constant pressure. Changes in pressure that tend to result from dilution of the solution cause a signal from the pressure monitor to be fed back to a motor control, which in turn adjusts the speed of the motor, thus altering the rate of dilution solvent input to maintain constant pressure. A signal from the motor speed control is simultaneously fed to the computer, which uses the associated changes in rate of input of dilution solvent to calculate concentration of solute in the cell and limiting viscosity of the solute according to the following equations:

$$C = C_o e^{-V/V_o}$$

$$\eta_{red} = \frac{R_o/R_s - 1}{C}$$

where $R_o$ is the flow rate of pure solvent through the capillary at time $t$, and $R_s$ is the flow rate of test solution through the capillary at time $t$.

The volume changes can then be converted to limiting viscosity number values in the same manner as the pressure changes described above. Alternatively both pressure and volume rate of throughput can be varied. Signals indicating the varying pressure and the varying rate of throughput are fed into the computer which calculates the limiting viscosity according to the following equations:

$$C = C_o e^{-V/V_o}$$

$$\eta_{red} = \frac{\frac{P_s}{P_o} \cdot \frac{R_o}{R_s} - 1}{C}$$

Unlike prior art apparatus and methods for determining limiting viscosity number, this invention provides an advantage in determining viscosity at different shear rates. Thus by simply using a constant speed motor with a higher or lower speed, a greater or smaller shear is applied to the sample solutions. The variations in pressure and shear rate obtainable are limited only by the size and strength of the apparatus and the availability of constant speed motors.

On the other hand an important characteristic of this invention is that for any single run viscosities can be measured at a constant shear rate. This is in contrast with prior art procedures relying upon gravity feed of a solution of solute and in which the head of solution decreases during the determination with consequent change in shear rate.

The apparatus used can be varied widely from that described above. Thus mixing the contents of the cell can be accomplished by any convenient means as, for example, by shaking the entire vessel. A magnetic stirrer is a convenient mixing device. Similarly the syringe can be replaced with any convenient pump which will supply solution to the cell at a desired rate, be that constant volume, constant pressure or otherwise. The capillary tube in FIG. 1 can be replaced by an orifice or other form of constriction and the stopcocks can be substituted by other closure devices. Although the FIG. 1 apparatus has two inlets 3 and 7, inlet 7 alone would suffice but with less convenience. In some instances more than two inlets might be desirable. Other modifications to suit particular circumstances will be apparent to those skilled in the art.

What is claimed is:
1. A process for measuring the viscosity of a solute in solution in a solvent comprising essentially:
  (1) forcing the solution under pressure through a constricted conduit at a measured rate of throughput,
  (2) periodically diluting the solution which enters the conduit with additional solvent, and
  (3) noting any changes in the pressure and any changes in rate of throughput as dilution of the solution proceeds.
2. The process of claim 1 in which the dilution of the solution is effected continuously at a constant volume rate.
3. The process of claim 2 in which the rate of solution throughput is at a constant volume rate and variations in pressure are noted.
4. The process of claim 3 in which the solute is a polymer.
5. The process of claim 1 in which the pressure is maintained constant and variations in volume rate of throughput are noted.

6. An apparatus for measuring limiting viscosity number comprising a closed vessel of constant volume fitted with at least one closable inlet conduit for introducing liquids into the vessel, a constricted outlet conduit, means for agitating the liquid in the vessel, pumping means for forcing liquid into the vessel through said inlet conduit and means for determining the pressure within the vessel and volume flow rate through the outlet conduit.

7. The apparatus of claim 6 in which the constricted outlet conduit is a capillary tube and the pumping means is a syringe activated by a constant speed motor to provide a constant volume rate of flow of liquid through the vessel.

References Cited

UNITED STATES PATENTS

| | | | |
|---|---|---|---|
| 2,208,444 | 7/1940 | Bailey | 73—55 X |
| 3,327,522 | 6/1967 | Hoyt | 73—55 |
| 3,375,704 | 4/1968 | Thompson, et al. | 73—55 |

LOUIS R. PRINCE, Primary Examiner

JOSEPH W. ROSKOS, Assistant Examiner